(12) United States Patent
Alpert et al.

(10) Patent No.: US 11,688,176 B2
(45) Date of Patent: Jun. 27, 2023

(54) DEVICES AND METHODS FOR CALIBRATING VEHICLE CAMERAS

(71) Applicant: Nauto, Inc., Palo Alto, CA (US)

(72) Inventors: Benjamin Alpert, Sunnyvale, CA (US); Alexander Dion Wu, San Carlos, CA (US)

(73) Assignee: Nauto, Inc., Palo Alto, CA (US)

( * ) Notice: Subject to any disclaimer, the term of this patent is extended or adjusted under 35 U.S.C. 154(b) by 258 days.

(21) Appl. No.: 17/085,014

(22) Filed: Oct. 30, 2020

(65) Prior Publication Data

US 2022/0138477 A1 May 5, 2022

(51) Int. Cl.
| | | |
|---|---|---|
| *G06V 20/00* | (2022.01) | |
| *G06V 20/58* | (2022.01) | |
| *H04N 7/18* | (2006.01) | |
| *G06N 3/08* | (2023.01) | |
| *H04N 5/262* | (2006.01) | |
| *G06V 10/25* | (2022.01) | |
| *G06V 20/59* | (2022.01) | |

(52) U.S. Cl.
CPC ............ *G06V 20/58* (2022.01); *G06N 3/08* (2013.01); *G06V 10/25* (2022.01); *G06V 20/59* (2022.01); *H04N 5/2628* (2013.01); *H04N 7/181* (2013.01)

(58) Field of Classification Search
CPC ........ G06V 20/58; G06V 10/25; G06V 20/59; G06N 3/08; H04N 5/2628; H04N 7/181; B60R 2300/402; B60R 1/23
See application file for complete search history.

(56) References Cited

U.S. PATENT DOCUMENTS

| | | | |
|---|---|---|---|
| 2017/0147891 A1* | 5/2017 | Satzoda | H04N 7/181 |
| 2018/0012085 A1* | 1/2018 | Blayvas | H04N 13/128 |
| 2019/0080608 A1* | 3/2019 | Lee | G08G 1/09623 |
| 2020/0074190 A1* | 3/2020 | Khakharia | G08G 1/167 |
| 2020/0394428 A1* | 12/2020 | Turcot | G06V 20/59 |
| 2021/0139024 A1* | 5/2021 | Crego | G08G 1/166 |
| 2021/0287019 A1* | 9/2021 | Wang | G06V 20/588 |

OTHER PUBLICATIONS

Bottazzi et al, Adaptive regions of interest based on HSV histograms for lane marks detection, J.-H. Kim et al. (eds.), Robot Intelligence Technology and Applications 2, Advances in Intelligent Systems and Computing 274, pp. 677-687 (Year: 2014).*
Sharifuddin et al Development of real-time lane detection software for automated steering system, International Conference for Technical Postgraduates (TECHPOS) pp. 1-6 (Year: 2009).*

(Continued)

*Primary Examiner* — Nancy Bitar
*Assistant Examiner* — Xiao Liu
(74) *Attorney, Agent, or Firm* — Vista IP Law Group, LLP

(57) ABSTRACT

An apparatus includes: a first camera configured to view an environment outside a vehicle; and a processing unit configured to receive images generated at different respective times by the first camera; wherein the processing unit is configured to identify objects in front of the vehicle based on the respective images generated at the different respective times, determine a distribution of the identified objects, and determine a region of interest based on the distribution of the identified objects in the respective images generated at the different respective times.

25 Claims, 10 Drawing Sheets

(56) References Cited

OTHER PUBLICATIONS

Llorca et al Stereo regions-of-interest selection for pedestrian protection: A survey, Transportation Research Part C: Emerging Technologies, vol. 25, pp. 226-237 (Year: 2012).*
Li et al ROI_Adaptive_Segmentation_Method_Based_on_Vanishing_Point_and_Vehicle_Height, 2018 IEEE 4th Information Technology and Mechatronics Engineering Conference (ITOEC), pp. 804-809 (Year: 2018).*
Huang et al Vehicle_ROI_Extraction_Based_on_Area_Estimation_Gaussian_Mixture_Model, 2017 3rd IEEE International Conference on Cybernetics (CYBCONF) (Year: 2017).*
Chou et al, Content-Based cropping using visual saliency and blur detection, 2017 10th International Conference on Ubi-media Computing and Workshops (Ubi-Media) (pp. 1-6) (Year: 2017).*
Li et al, A2-RL: Aesthetics Aware Reinforcement Learning for Image Cropping, 2018 CVPR (Year: 2018).*

\* cited by examiner

DEVICES AND METHODS FOR CALIBRATING VEHICLE CAMERAS

FIELD

The field relates to vehicle cameras, and more particularly, to devices and methods for calibrating vehicle cameras.

BACKGROUND

Cameras have been used in vehicles to capture images of environment outside the vehicles. For example, cameras have been installed in vehicles for detecting lane boundaries. Cameras have also been installed in vehicles for detecting objects, such as cars, pedestrians, etc. These cameras can be installed in the vehicles during manufacturing of the vehicles. In other cases, the cameras may be aftermarket devices that are installed in the vehicles after the vehicles have been manufactured.

Aftermarket cameras may be mounted by end-users at different angles and positions with respect to the vehicles. Thus, the mounting orientations and positioning with respect to the vehicles can be very variable for aftermarket cameras. This problem may also occur to some extent for factory-installed cameras. Sometimes cameras may be installed out of alignment during manufacturing of the vehicles. Even if the cameras are installed correctly, they may vary slightly in position and/or orientation from vehicle to vehicle.

In certain applications, it may be desirable to determine a region of interest for processing vehicle camera images. For example, for a given mounting position and orientation of a camera with respect to a vehicle, it may be desirable to determine a region of interest for processing camera images. Such region of interest may reduce computation time needed to process the camera images as only a subset of the entire camera image is processed instead. In existing solutions, calibration of cameras to identify a region of interest for processing camera images requires a person to provide input during the calibration process. For example, depending on the mounting position and orientation of the camera, a person may need to examine a camera image to identify a region of interest in the camera image, and then provide user input to place a marker at certain location in an image frame to define the region of interest.

New techniques for calibrating vehicle cameras are described herein.

SUMMARY

An apparatus includes: a first camera configured to view an environment outside a vehicle; and a processing unit configured to receive images generated at different respective times by the first camera; wherein the processing unit is configured to identify objects in front of the vehicle based on the respective images generated at the different respective times, determine a distribution of the identified objects, and determine a region of interest based on the distribution of the identified objects in the respective images generated at the different respective times.

Optionally, the apparatus further includes a non-transitory medium storing a model, wherein the processing unit is configured to identify the objects in front of the vehicle using the model.

Optionally, the model comprises a neural network model.

Optionally, the apparatus further includes a communication unit configured to obtain the neural network model.

Optionally, the neural network model is trained based on images transmitted by on-board devices in other vehicles.

Optionally, the objects comprise leading vehicles in front of the vehicle, and wherein the processing unit is configured to identify the leading vehicles using the model.

Optionally, the processing unit is also configured to determine identifiers corresponding with the identified objects respectively.

Optionally, the identifiers comprise respective boxes corresponding with the respective identified objects.

Optionally, the identifiers comprise respective horizontal lines corresponding with respective identified objects.

Optionally, the processing unit is configured to combine the identifiers to form a set of identifiers representing the distribution of the identified objects.

Optionally, the region of interest is based on, or corresponds with, the set of identifiers.

Optionally, the set of identifiers comprises graphical elements combined into a composite object.

Optionally, the composite object has a tapered configuration.

Optionally, the composite object has a first area that is closer to a bottom of a camera frame than to a top of the camera frame, and a second area that is above the first area, and wherein the first area has a width that is longer than a width of the second area.

Optionally, the processing unit is also configured to determine a collision risk based on the region of interest.

Optionally, the processing unit is also configured to determine an obstacle in a trajectory of the vehicle based on the region of interest.

Optionally, the processing unit is configured to: determine the region of interest automatically in response to an activation of the apparatus, and/or update the region of interest periodically.

Optionally, the first camera and the processing unit are integrated as parts of an aftermarket device for the vehicle.

Optionally, the apparatus further includes a second camera configured to view inside a cabin of the vehicle, wherein the second camera is a part of the aftermarket device.

Optionally, the processing unit is configured to determine an image crop frame based on the identified objects.

Optionally, the processing unit is configured to determine a median position of the identified objects, and determine the image crop frame based on the median position.

Optionally, the processing unit is configured to update the image crop frame repeatedly.

Optionally, the processing unit is configured to update the image crop frame repeatedly until a solution converges.

An apparatus includes: a first camera configured to view an environment outside a vehicle; and a processing unit configured to receive images generated at different respective times by the first camera; wherein the processing unit is configured to identify leading vehicles in front of the vehicle based on the respective images generated at the different respective times; wherein the processing unit is configured to determine identifiers corresponding with the identified leading vehicles respectively; wherein the processing unit is configured to combine the identifiers to form a set of identifiers; and wherein the processing unit is configured to determine a region of interest based on the set of identifiers.

A method performed by an apparatus includes: receiving images generated at different respective times by a first camera viewing an environment outside a vehicle; identifying objects in front of the vehicle based on the respective images generated at the different respective times; determining a distribution of the identified objects; and determining a region of interest based on the distribution of the identified objects in the respective images generated at the different respective times.

An apparatus includes: a camera configured to view an environment inside a vehicle; and a processing unit configured to receive images generated at different respective times by the camera; wherein the processing unit is configured to identify objects in a cabin of the vehicle based on the respective images generated at the different respective times, determine a distribution of the identified objects, and determine a region of interest based on the distribution of the identified objects in the respective images generated at the different respective times.

Other and further aspects and features will be evident from reading the following detailed description.

BRIEF DESCRIPTION OF THE DRAWINGS

The drawings illustrate the design and utility of embodiments, in which similar elements are referred to by common reference numerals. In order to better appreciate how advantages and objects are obtained, a more particular description of the embodiments will be described with reference to the accompanying drawings. Understanding that these drawings depict only exemplary embodiments and are not therefore to be considered limiting in the scope of the claimed invention.

DESCRIPTION OF THE EMBODIMENTS

Figure 1:
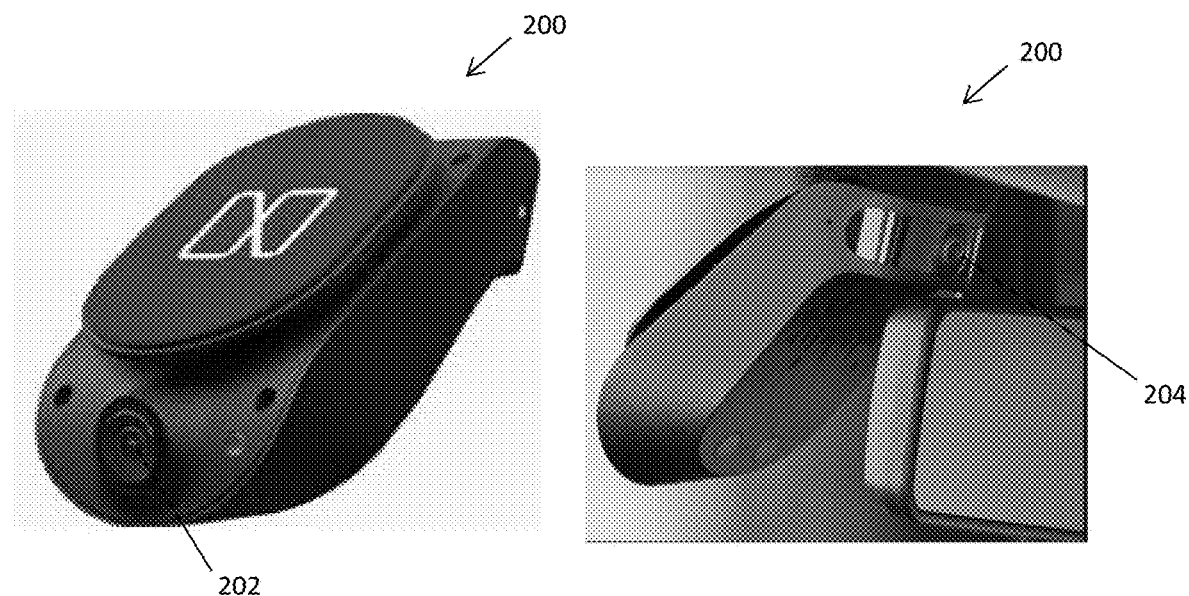
FIG. 1 illustrates an apparatus in accordance with some embodiments.

Various embodiments are described hereinafter with reference to the figures. It should be noted that the figures may or may not be drawn to scale and that elements of similar structures or functions are represented by like reference numerals throughout the figures. It should also be noted that the figures are only intended to facilitate the description of the embodiments. They are not intended as an exhaustive description of the claimed invention or as a limitation on the scope of the claimed invention. In addition, an illustrated embodiment needs not have all the aspects or advantages of the invention shown. An aspect or an advantage described in conjunction with a particular embodiment is not necessarily limited to that embodiment and can be practiced in any other embodiments even if not so illustrated or if not so explicitly described.

FIG. 1 illustrates an apparatus 200 in accordance with some embodiments. The apparatus 200 is configured to be mounted to a vehicle, such as to a windshield of the vehicle, to the rear mirror of the vehicle, etc. The apparatus 200 includes a first camera 202 configured to view outside the vehicle, and a second camera 204 configured to view inside a cabin of the vehicle. In the illustrated embodiments, the apparatus 200 is in a form of an after-market device that can be installed in a vehicle (i.e., offline from the manufacturing process of the vehicle). The apparatus 200 may include a connector configured to couple the apparatus 200 to the vehicle. By means of non-limiting examples, the connector may be a suction cup, an adhesive, a clamp, one or more screws, etc. The connector may be configured to detachably secure the apparatus 200 to the vehicle, in which case, the apparatus 200 may be selectively removed from and/or coupled to the vehicle as desired. Alternatively, the connector may be configured to permanently secure the apparatus 200 to the vehicle. In other embodiments, the apparatus 200 may be a component of the vehicle that is installed during a manufacturing process of the vehicle. It should be noted that the apparatus 200 is not limited to having the configuration shown in the example, and that the apparatus 200 may have other configurations in other embodiments. For example, in other embodiments, the apparatus 200 may have a different form factor. In other embodiments, the apparatus 200 may be an end-user device, such as a mobile phone, a tablet, etc., that has one or more cameras.

Figure 2:
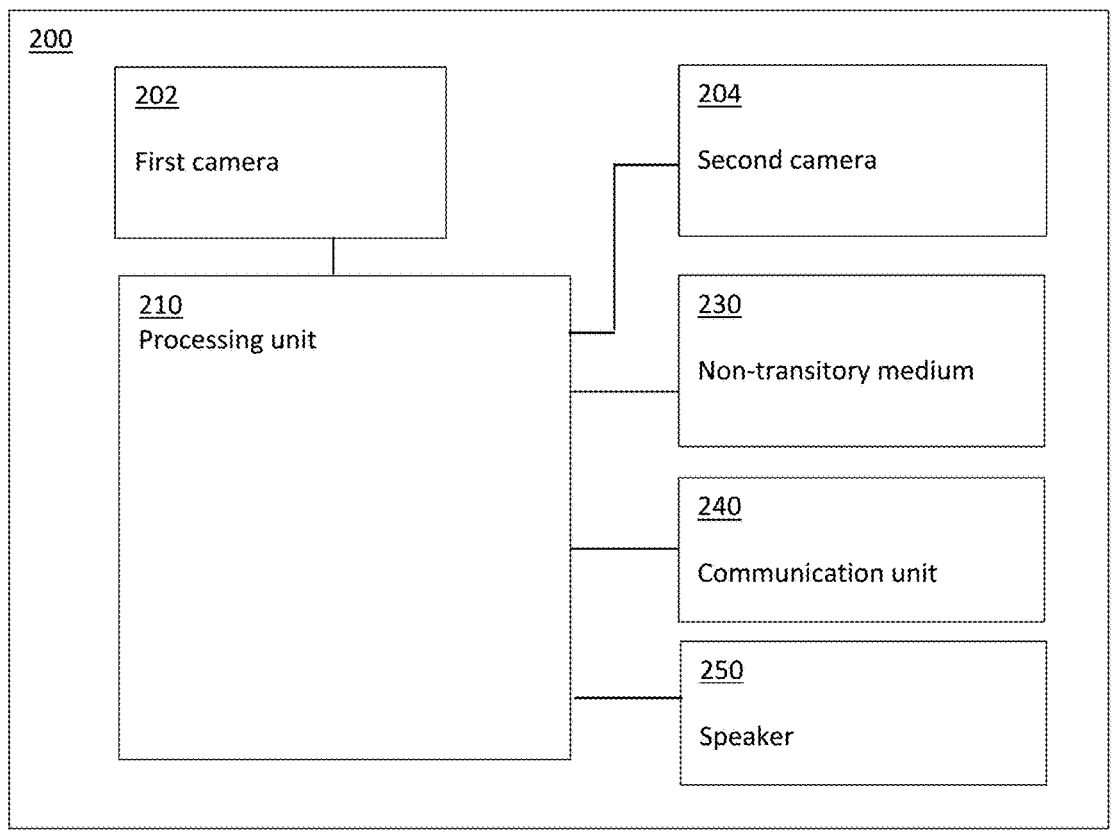
FIG. 2 illustrates a block diagram of the apparatus of FIG. 1 in accordance with some embodiments.

FIG. 2 illustrates a block diagram of the apparatus 200 of FIG. 1 in accordance with some embodiments. The apparatus 200 includes the first camera 202 and the second camera 204. As shown in the figure, the apparatus 200 also includes a processing unit 210 coupled to the first camera 202 and the second camera 204, a non-transitory medium 230 configured to store data, a communication unit 240 coupled to the processing unit 210, and a speaker 250 coupled to the processing unit 210.

In the illustrated embodiments, the first camera 202, the second camera 204, the processing unit 210, the non-transitory medium 230, the communication unit 240, and the speaker 250 may be integrated as parts of an aftermarket device for the vehicle. In other embodiments, the first camera 202, the second camera 204, the processing unit 210, the non-transitory medium 230, the communication unit 240, and the speaker 250 may be integrated with the vehicle, and may be installed in the vehicle during a manufacturing process of the vehicle.

The processing unit 210 is configured to obtain images from the first camera 202 and images from the second camera 204, and process the images from the first and second cameras 202, 204. In some embodiments, the images from the first camera 202 may be processed by the processing unit 210 to monitor an environment outside the vehicle (e.g., for collision detection, collision prevention, driving environment monitoring, etc.). Also, in some embodiments, the images from the second camera 204 may be processed by the processing unit 210 to monitor a driving behavior of the driver (e.g., whether the driver is distracted, drowsy, focused, etc.). In further embodiments, the processing unit 210 may process images from the first camera 202 and/or the second camera 204 to determine a risk of collision, to predict the collision, to provision alerts for the driver, etc. In other embodiments, the apparatus 200 may not include the second camera 204.

The processing unit 210 of the apparatus 200 may include hardware, software, or a combination of both. By means of non-limiting examples, hardware of the processing unit 210 may include one or more processors and/or more or more integrated circuits. In some embodiments, the processing unit 210 may be implemented as a module and/or may be a part of any integrated circuit.

The non-transitory medium 230 is configured to store data relating to operation of the processing unit 210. In the illustrated embodiments, the non-transitory medium 230 is configured to store a model, which the processing unit 210 can access and utilize to identify objects in images from the first camera 202. Alternatively, the model may configure the processing unit 210 so that it has the capability to identify objects in images from the first camera 202. Optionally, the non-transitory medium 230 may also be configured to store image(s) from the first camera 202, and/or image(s) from the second camera 204. Also, in some embodiments, the non-transitory medium 230 may also be configured to store data generated by the processing unit 210.

The model stored in the transitory medium 230 may be any computational model or processing model, including but not limited to neural network model. In some embodiments, the model may include feature extraction parameters, based upon which, the processing unit 210 can extract features from images provided by the first camera 202 for identification of objects. Also, in some embodiments, the model may include program instructions, commands, scripts, etc. In one implementation, the model may be in a form of an application that can be received wirelessly by the apparatus 200.

The communication unit 240 of the apparatus 200 is configured to receive data wirelessly from a network, such as a cloud, the Internet, Bluetooth network, etc. In some embodiments, the communication unit 240 may also be configured to transmit data wirelessly. For example images from the first camera 202, images from the second camera 204, data generated by the processing unit, or any combination of the foregoing, may be transmitted by the communication unit 240 to another device (e.g., a server, an accessory device such as a mobile phone, another apparatus 200 in another vehicle, etc.) via a network, such as a cloud, the Internet, Bluetooth network, etc. In some embodiments, the communication unit 240 may include one or more antennas. For example, the communication 240 may include a first antenna configured to provide long-range communication, and a second antenna configured to provide near-field communication (such as via Bluetooth). In other embodiments, the communication unit 240 may be configured to transmit and/or receive data physically through a cable or electrical contacts. In such cases, the communication unit 240 may include one or more communication connectors configured to couple with a data transmission device. For example, the communication unit 240 may include a connector configured to couple with a cable, a USB slot configured to receive a USB drive, a memory-card slot configured to receive a memory card, etc.

The speaker 250 of the apparatus 200 is configured to provide audio alert(s) and/or message(s) to a driver of the vehicle. For example, in some embodiments, the processing unit 210 may be configured to detect an imminent collision between the vehicle and an object outside the vehicle. In such cases, in response to the detection of the imminent collision, the processing unit 210 may generate a control signal to cause the speaker 250 to output an audio alert and/or message.

Although the apparatus 200 is described as having the first camera 202 and the second camera 204, in other embodiments, the apparatus 200 may include only the first camera 202, and not the second camera 204. Also, in other embodiments, the apparatus 200 may include multiple cameras configured to view the environment outside the vehicle.

Figure 3:
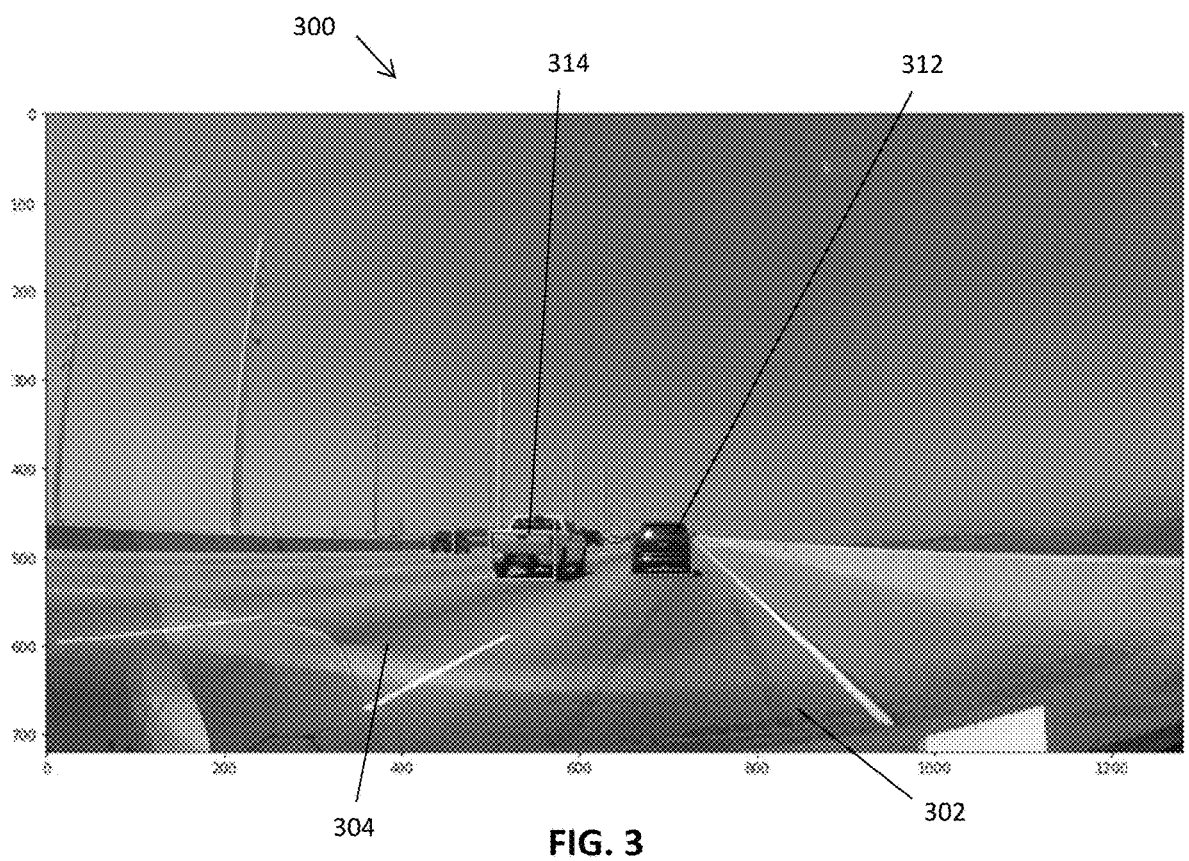
FIG. 3 illustrates an example of an image captured by a camera of the apparatus of FIG. 2.

During use, the apparatus 200 is coupled to a vehicle such that the first camera 202 is viewing outside the vehicle. While the driver operates the vehicle, the first camera 202 captures images outside the vehicle. FIG. 3 illustrates an example of an image 300 captured by the first camera 202 of the apparatus 200 of FIG. 2. As shown in the figure, an image 300 from the first camera 202 may include an image of the lane 302 in which the subject vehicle (the vehicle with the apparatus 200) is traveling, an image of adjacent lane(s) 304, an image of a leading vehicle 312 in the lane 302, and an image of other vehicle(s) 314 in the other lane(s) 304. As used in this specification, the term "leading vehicle" refers to any vehicle that is in the same lane the subject vehicle (the vehicle with the apparatus 200) is traveling. In the illustrated embodiments, the processing unit 210 of the apparatus 200 is configured to identify the leading vehicle 312 that is in the lane 302 in which the vehicle is traveling. In particular, the processing unit 210 processes the image 300 to extract features in the image 300, and determines whether an object in the image 300 is a leading vehicle or not based on the extracted features. By means of non-limited examples, the features that the processing unit 210 extracts from the image 300 may be a trunk of a vehicle, tail lights of a vehicle, rear mirror of a vehicle, side door of a vehicle, side window of a vehicle, a roof of a vehicle, etc.

In some embodiments, the processing unit 210 is configured to distinguish the leading vehicle 312 from other vehicle(s) 314 that is not in the same lane 302. In one implementation, the processing unit 210 can make such differentiation based on the shape of the detected feature(s). For example, the trunk shape of the leading vehicle 312 may have a relatively more symmetric configuration compared to another vehicle 314 (that may have skewed/non-symmetric shape due to the angle of view from the first camera 202) that is off towards a side of the lane 302. Also, in some cases, the processing unit 210 may determine whether a detected object has a side door or side window. If so, the object is more likely to be another vehicle 314 that is not a leading vehicle. This is because side doors and side windows of a leading vehicle that is in front of the subject vehicle may not be visible to the first camera 202. On the other hand, another vehicle 314 that is in adjacent lane 304 may have side door and/or side window that is more visible to the first camera 202.

In the illustrated embodiments, the first camera 202 generates multiple images over a period of time while the vehicle is being driven by the user. The processing unit 210 processes the images to identify leading vehicle(s) in different camera images at different respective times. For example, if the subject vehicle (with the apparatus 200) is following the leading vehicle 312 during a period, the processing unit 210 may identify the leading vehicle 312 at multiple times during the period. As another example, the subject vehicle (with the apparatus 200) may be following different leading vehicles at different times. In such cases, the processing unit 210 may identify the different leading vehicles at the different respective times.

Identification of leading vehicles may be determined (e.g., by a vehicle identification module in the processing unit 210) using equations, regression, classification, neural networks (e.g., convolutional neural networks, deep neural networks), heuristics, selection (e.g., from a library, graph, or chart), instance-based methods (e.g., nearest neighbor), correlation methods, regularization methods (e.g., ridge regression), decision trees, Baysean methods, kernel methods, probability, deterministics, a combination of the above, or any other suitable method. The classification of an object as a leading vehicle can be a binary classification or binary score (e.g., a leading vehicle or not), a score (e.g., continuous or discontinuous), a classification (e.g., high, medium, low), or be any other suitable measure of lead vehicle identification.

In some embodiments, deep learning or artificial intelligence may be used to develop a model that identifies leading vehicles. Such a model can distinguish a vehicle that is in the current lane (i.e., the lane in which the vehicle with the apparatus 200 is traveling) from another vehicle that is not in the current lane. Also, context-based identification of leading vehicles is advantageous because it allows the processing unit 210 to more accurately identify leading vehicles and to distinguish them from non-leading vehicles. In some cases, even if the apparatus 200 is mounted at very off angle with respect to the vehicle (which may result in the leading vehicles appearing at odd angles and/or positions in the camera images), context-based identification will still allow the processing unit 210 to identify leading vehicles accurately.

Figure 4:
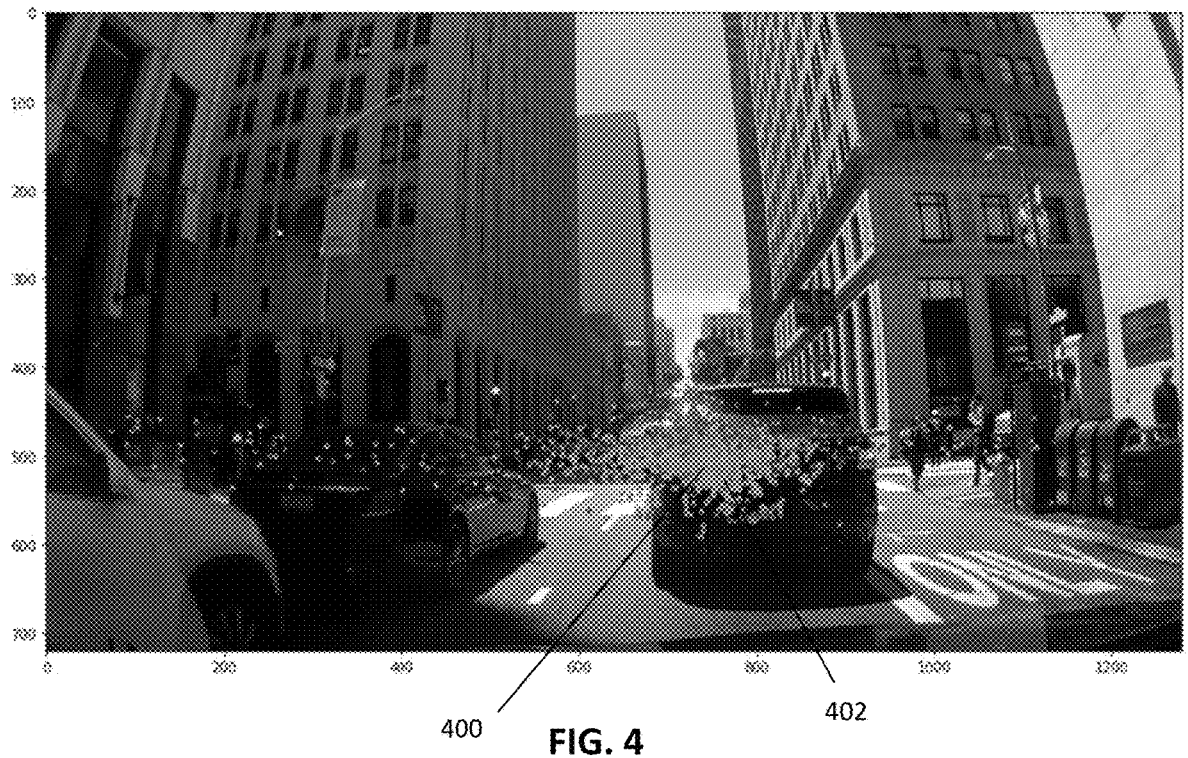
FIG. 4 illustrates an example of object identifiers, particularly showing each object identifier being a dot representing a leading vehicle.

In some embodiments, the processing unit 210 may be configured to determine identifiers corresponding with respective identified objects in different camera images provided by the first camera 202. By means of non-limiting examples, each identifier may be a dot, a box (e.g., a rectangular box, a square box, a trapezoidal box, any polygonal box, a circular box, an elliptical box, or any curvilinear box), a line, or any of other graphical or geometric identifiers. FIG. 4 illustrates an example of object identifiers 400, particularly showing each object identifier 400 being a dot 402 representing a leading vehicle. Each dot 402 has a position that corresponds with a position of a detected leading vehicle with respect to an image frame of the first camera 202. For examples, the position of each dot 402 may be a center of the detected leading vehicle, a corner of the detected leading vehicle, a top center of the detected leading vehicle, a bottom center of the detected leading vehicle, or any of other reference locations with respect to the detected leading vehicle as it appears in an image of the first camera 202. In other examples, the position of each dot 402 may be a center of a box identifying the leading vehicle, a corner of such box, a top center of such box, a bottom center of such box, or any of other reference locations with respect to the box. In the illustrated example of FIG. 4, the dots 402 represent identified leading vehicles that appear in different images over time, and the distribution of the dots 402 are presented in a current camera image.

Figure 5:
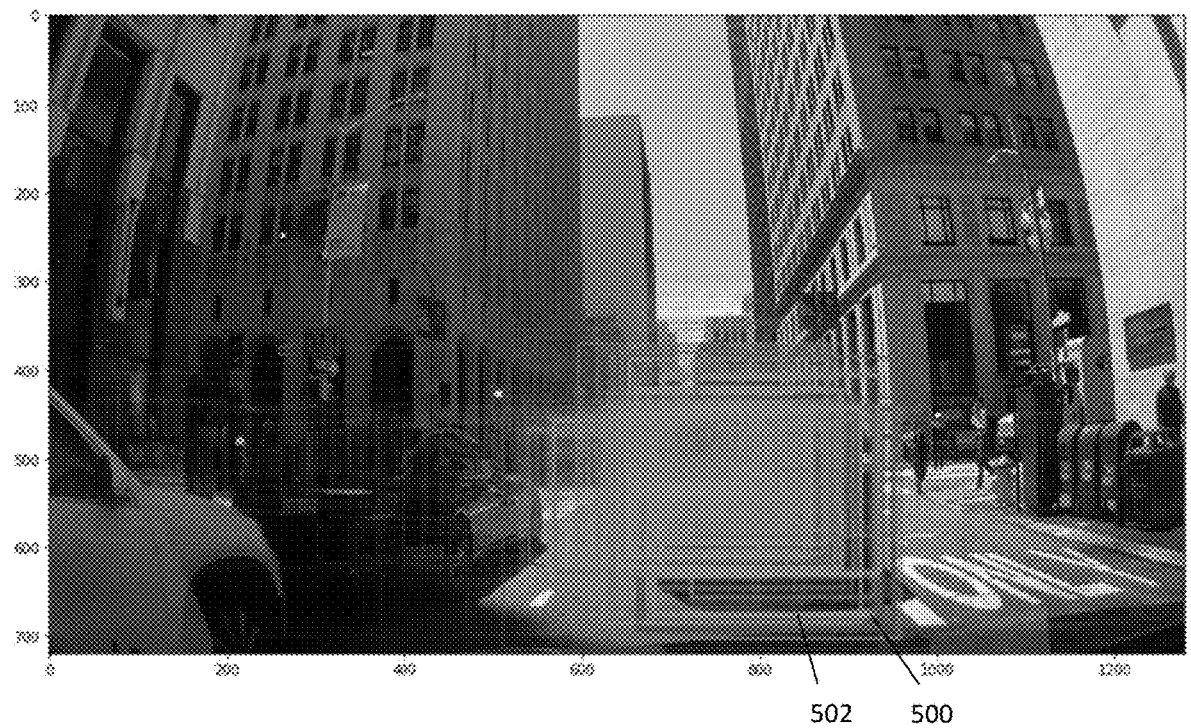
FIG. 5 illustrates another example of object identifiers, particularly showing each object identifier being a box representing a leading vehicle.

FIG. 5 illustrates another example of object identifiers 500, particularly showing each object identifier 500 being a box 502 representing a leading vehicle. In the illustrated example, each box 502 identifies a leading vehicle as it appears in a camera image. In the illustrated example, the boxes 502 represent identified leading vehicles that appear in different images over time, and the distribution of the boxes 502 are presented in a current camera image.

In some embodiments, the boxes 502 may have the same aspect ratio regardless of the geometries of the identified leading vehicles. In other embodiments, the boxes 502 may have different shapes (e.g., aspect ratios) that correspond with the respective geometries (e.g., shapes) of the identified leading vehicles. For example, a wider leading vehicle will have a corresponding box 502 that is wider compared to a narrower leading vehicle. Also, in the illustrated example, the boxes 502 have different sizes, which depend on how far the leading vehicles are detected. A leading vehicle detected further away from the first camera 202 will have a corresponding smaller box 502 compared to a leading vehicle that is detected closer to the first camera 202.

In some embodiments, each box 502 identifying a leading vehicle may have a dimension that is dynamically determined based on the size of the image of the leading vehicle as it appears in the image. For example, the box 502 may be configured to have a dimension such that the box 502 circumscribes the boundary, or at least a part of the boundary, of the leading vehicle in the image. In other embodiments, the box 502 may be dynamically determined to have a size such that it is within the boundary of the image of the leading vehicle.

In the above embodiments, the box 502 identifying a leading vehicle is shown as a square or rectangle. In other embodiments, the box 502 may have different shapes. For example, in other embodiments, each box 502 may have a trapezoidal shape, a triangular shape, any of other polygonal shapes, a circular shape, an elliptical shape, or any of other curvilinear shapes.

Figure 6:
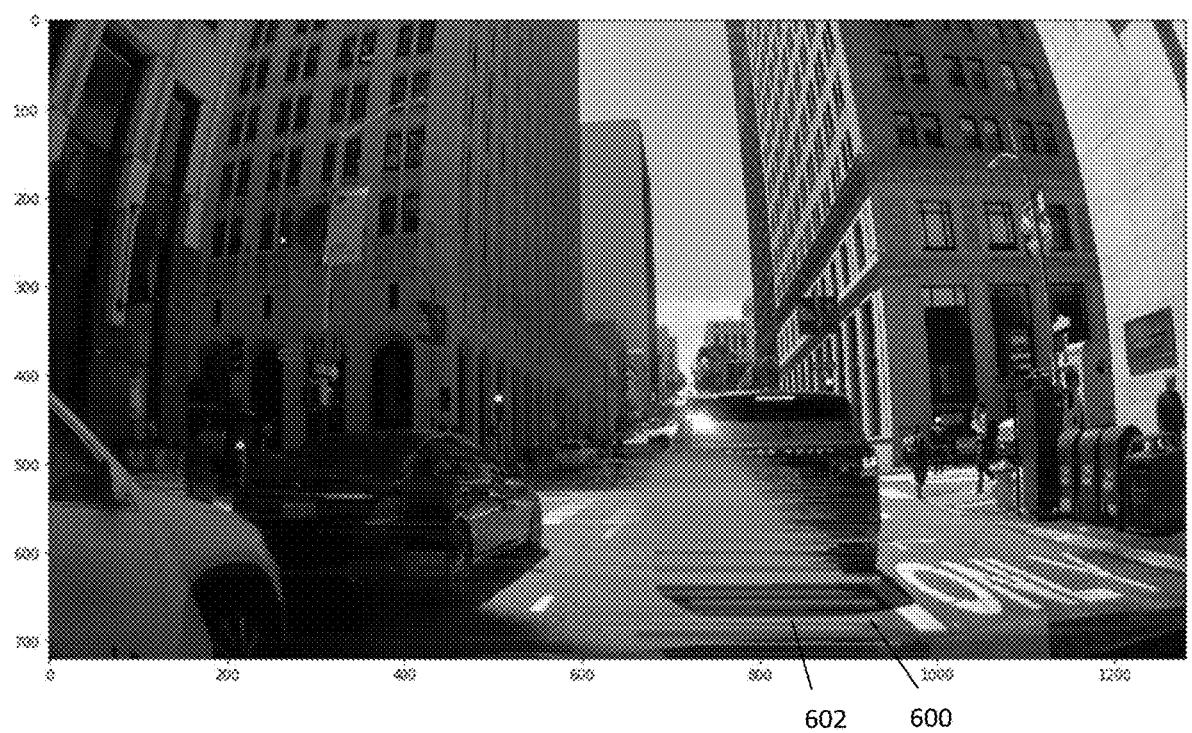
FIG. 6 illustrates another example of object identifiers, particularly showing each object identifier being a horizontal line.

FIG. 6 illustrates an example of object identifiers 600, particularly showing each object identifier 600 being a line 602. In the illustrated example, each line 602 identifies a leading vehicle as it appears in different respective images. In some embodiments, the lines 602 may have the same length regardless of the geometries of the identified leading vehicles. In other embodiments, the lines 602 may have different lengths that correspond with the respective sizes (e.g., widths) of the identified leading vehicles. For example, a wider leading vehicle will have a corresponding line 602 that is longer (e.g., wider) compared to a narrower leading vehicle. Also, in the illustrated example, the lines 602 have different sizes, which depend on how far the leading vehicles are detected. A leading vehicle detected further away from the first camera 202 will have a corresponding shorter line 602 compared to a leading vehicle that is detected closer to the first camera 202.

In some embodiments, each line 602 identifying a leading vehicle may have a dimension that is dynamically determined based on the size of the image of the leading vehicle as it appears in the image. Since the size of the image of the leading vehicle as it appears in the image is already based on the actual size of the leading vehicle as well as a distance of the leading vehicle from the camera 202, the line 602 determined based on the size of the image of the leading vehicle as it appears in the image will account for the size of the leading vehicle and its distance from the camera 202. In some embodiments, the line 602 may be configured to have a dimension such that it matches with a dimension of the image of the leading vehicle. In other embodiments, the line 602 may be dynamically determined to have a size such that it is longer or shorter than a dimension of the image of the leading vehicle.

In the above embodiments, the line 602 identifying a leading vehicle is shown as a horizontal line with a rectilinear configuration. In other embodiments, the line 602 may have different orientations. For example, in other embodiments, each line 502 may have a vertical configuration, or a slanted configuration. Also, in other embodiments, each line 602 may have a non-rectilinear configuration. For example, each line 602 may have a zig-zag configuration, a sinusoidal configuration, etc., extending horizontally, vertically, or in any of other directions. Furthermore, in other embodiments, instead of each line 602 being a solid line, each line 602 may be a dotted line, a dashed line, or any of other lines with different styles.

Figure 7:
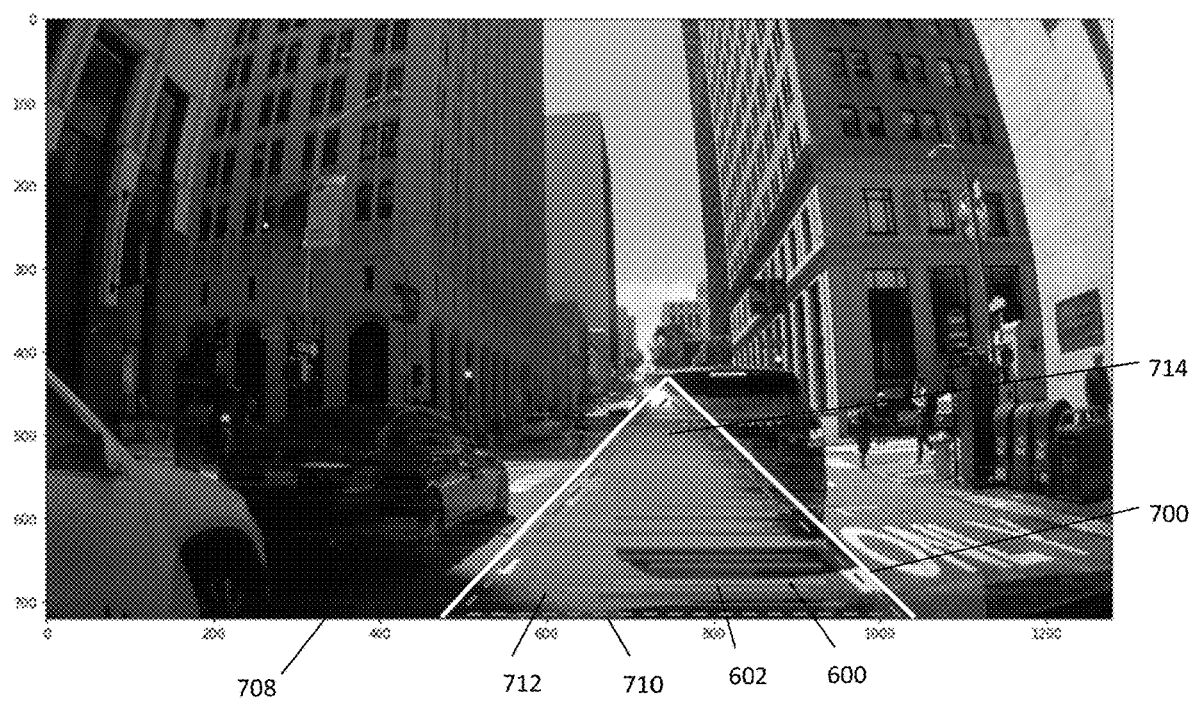
FIG. 7 illustrates an example of a region of interest determined based on distribution of identified objects.

In some embodiments, after the processing unit 210 has determined the distribution of the identified leading vehicles as they appear in the different images, the processing unit 210 then determines a region of interest based on the distribution. FIG. 7 illustrates an example of a region of interest 700 determined based on distribution of identified objects. Following the above example of FIG. 6, in which the identifiers of the identified leading vehicles are lines 602, the processing unit 210 may be configured to determine the region of interest 700 based on the distribution of the identified leading vehicles (as represented by the lines 602). As shown in the figure, the lines 602 representing the distribution of the identified leading vehicles collectively form a composite object 710. Accordingly, the processing unit 210 of the apparatus 200 may determine the two-dimensional area within the boundary of the composite object 710 as the region of interest 700. In some embodiments, the region of interest 700 may be determined by the processing unit 210 to have a size that is larger than the composite object 710, wherein the boundary of the region of interest 700 circumscribes the composite object 710. In other embodiments, the region of interest 700 may be determined by the processing unit 210 to have the same size as that of the composite object 710. In further embodiments, the region of interest 700 may be determined by the processing unit 210 to have a size that is smaller than the composite object 710.

In the above example, the composite object 710 (illustrated in dotted-lines) has a tapered configuration in the illustrated example. In particular, the composite object 710 has a first area 712 that is closer to a bottom of a camera frame 708 than to a top of the camera frame 708, and a second area 714 that is above the first area 712, and wherein the first area 712 has a width that is longer than a width of the second area 714. Accordingly, the region of interest 700 determined based on the composite object 710 may also have a tapered configuration like that shown in the figure. Because the region of interest 700 is determined by the processing unit 210 based on identified leading vehicles that were in front of the subject vehicle travelling in the same lane, the configuration (e.g., size, shape, position with respect to image frame) of the region of interest 700 corresponds with the geometry of the lane (as it appears in the images) in which the subject vehicle is traveling. Therefore, the region of interest 700 can function as a two-dimensional collision detection area, wherein any object detected within this detection area may be considered as an obstacle that has a possible risk of collision with the subject vehicle.

In the above example, the region of interest 700 is described as being determined based on lines 602 that are identifiers of leading vehicles. In other embodiments, the region of interest 700 may be determined based on other forms of identifiers (such as any of the examples described herein) of leading vehicles. The processing unit 210 is configured to combine the identifiers to form a set of identifiers representing the distribution of the identified objects. As a result the region of interest 700 determined by the processing unit 210 corresponds with the set of identifiers of the leading vehicles.

It should be noted that the configuration of each identifier corresponding to the identified leading vehicle is not limited to the examples described, and that the identifier for each identified leading vehicle may have other configurations in other embodiments. For example, in other embodiments, each identifier representing an identified leading vehicle may be a circle, and ellipse, a triangle, or any of other graphical elements.

In one or more embodiments described herein, the processing unit 210 may be further configured to determine a collision risk based on the region of interest, and/or to determine an obstacle in a trajectory of the vehicle based on the region of interest 700. In particular, as described herein, the region of interest 700 has a configuration that corresponds with the geometry of the lane (as it appears in images) in which the subject vehicle is traveling. Thus, the region of interest 700 may be utilized as a two-dimensional collision detection area for monitoring potential collision between the subject vehicle and object(s) that appear in the collision detection area.

In some embodiments, the processing unit 210 may be configured to: determine the region of interest 700 automatically in response to an activation of the apparatus 200. For example, in some embodiments, the apparatus 200 may have a power-on button. In such cases, after the apparatus 200 is powered on via the power-on button, the processing unit 210 may then determine the region of interest 700 automatically. In other embodiments, the apparatus 200 may be coupled to a power and/or ignition system of the vehicle. In such cases, after the apparatus 200 has detected that the vehicle has been started or powered on, the processing unit may then determine the region of interest 700 automatically. In further embodiments, the determining of the region of interest 700 may not be determined automatically. Instead, the determination of the region of interest 700 may be performed by the processing unit 210 in response to an input from a user of the apparatus 200. In one implementation, the apparatus 200 may include a user interface, such as a calibration button. In such cases, after the user has pressed the calibration button, the processing unit 210 then determines the region of interest 700 using any of the techniques described herein.

After the region of interest 700 has been determined, the processing unit 210 may then perform further functions based on the determined region of interest 700. For example, the processing unit 210 may limit the amount of image data it will need to process by cropping or disregarding certain parts of the camera images from the first camera 202. As other examples, the processing unit 210 may use the region of interest 700 to monitor objects (e.g., cars, bicycles, persons, etc.) in the region of interest 700, and/or to detect objects (e.g., cars, bicycles, persons, etc.) that have entered or are entering into the region of interest 700. In some embodiments, based on the detected object(s), the processing unit 210 can also determine whether there is a risk of collision between the vehicle and the detected object(s).

In some embodiments, the processing unit 210 may use the region of interest 700 to determine whether an identified object is relevant or not for a particular purpose (e.g., whether the identified object belongs to a certain category). For example, the processing unit 210 may identify a vehicle in a camera image, and may determine whether the identified vehicle is a leading vehicle based on the position of the identified vehicle with respect to the region of interest 700. In some cases, if at least a part of the identified vehicle is in the region of interest 700, or is within a distance from a boundary of the region of interest 700, then the processing unit 210 may determine that the identified vehicle is a leading vehicle. Thus, as used in this specification, the term "region of interest" is not limited to a region for detecting object inside that region, and may refer to any region for identifying object or for processing identified object that is intercepts the region or that is away from the region.

In some embodiments, the processing unit 210 may be configured to update the region of interest 700 periodically. For example, while the apparatus 200 is performing object(s) detection as the vehicle is being driven, the processing unit 210 may periodically use previous images captured by the camera 202 of the apparatus 200 to determine the region of interest 700. In some cases, the previous images used by the processing unit 210 to determine the region of interest 700 may be images that were captured in a moving window of time, such as within the preceding 3 minutes, 2 minutes, 1 minute, 30 seconds, etc. In one implementation, the processing unit 210 may run a calibration algorithm on a regular basis, e.g., once every few minutes, to determine the region of interest 700. Having the processing unit 210 periodically determine the region of interest 700 to update the region of interest 700 is advantageous because the apparatus 700 may be moved (intentionally or unintentionally) or remounted during use. As a result, the region of interest 700 corresponding with the space in front of the vehicle (to which the vehicle is traveling) as it appears in the camera images may shift in position with respect to the image frame. By periodically determining the region of interest 700, the shape of the region of interest 700 and the position (with respect to the image frame) of the region of interest 700 will be updated periodically. This allows the processing unit 210 to accurately monitor objects outside the vehicle with respect to the lane in which the vehicle is traveling. If the apparatus 200 is moved, then no manual intervention is needed, and the apparatus 200 can be self-corrected periodically.

Figure 8:
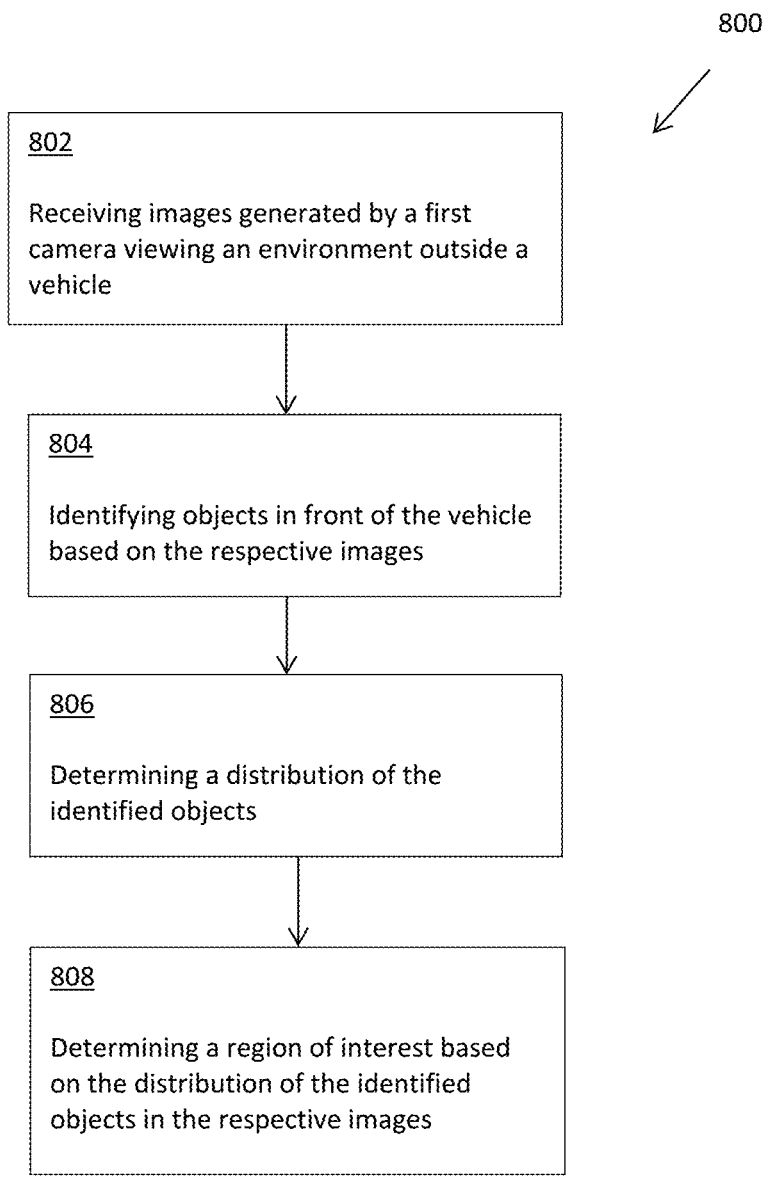
FIG. 8 illustrates a method performed by the apparatus of FIG. 2 in accordance with some embodiments.

FIG. 8 illustrates a method 800 performed by the apparatus 200 of FIG. 2 in accordance with some embodiments. The method 800 includes receiving images generated by a first camera viewing an environment outside a vehicle (item 802), identifying objects in front of the vehicle based on the respective images (item 804), determining a distribution of the identified objects (item 806), and determining a region of interest based on the distribution of the identified objects in the respective images (item 808). In some embodiments, in item 802, the images are generated at different respective times by the first camera. Also, in some embodiments, in item 804, the identified objects may be different objects (e.g., different leading vehicles) in different respective images that are generated at different respective times.

Optionally, in the method 800, the objects in front of the vehicle are identified using a model.

Optionally, in the method 800, the model comprises a neural network model.

Optionally, the method 800 further includes obtaining the neural network model by a communication unit.

Optionally, in the method 800, the neural network model is trained based on images transmitted by on-board devices in other vehicles.

Optionally, in the method 800, the objects comprise leading vehicles in front of the vehicle, and wherein the leading vehicles are identified using the model.

Optionally, the method 800 further includes determining identifiers corresponding with the identified objects respectively.

Optionally, in the method 800, the identifiers comprise respective boxes corresponding with the respective identified objects.

Optionally, in the method 800, the identifiers comprise respective horizontal lines corresponding with respective identified objects.

Optionally, the method 800 further comprises combining the identifiers to form a set of identifiers representing the distribution of the identified objects.

Optionally, in the method 800, the region of interest is based on, or corresponds with, the set of identifiers.

Optionally, in the method 800, the set of identifiers comprises graphical elements combined into a composite object.

Optionally, in the method 800, the composite object has a tapered configuration.

Optionally, in the method 800, the composite object has a first area that is closer to a bottom of a camera frame than to a top of the camera frame, and a second area that is above the first area, and wherein the first area has a width that is longer than a width of the second area.

Optionally, the method 800 further includes determining a collision risk based on the region of interest.

Optionally, the method 800 further includes determining an obstacle in a trajectory of the vehicle based on the region of interest.

Optionally, in the method 800, the region of interest is determined automatically in response to an activation of the apparatus.

Optionally, in the method 800, the region of interest is updated periodically.

Optionally, in the method 800, the first camera and the processing unit are integrated as parts of an aftermarket device for the vehicle. In some cases, the aftermarket device further includes a second camera configured to view inside a cabin of the vehicle.

Figure 9:
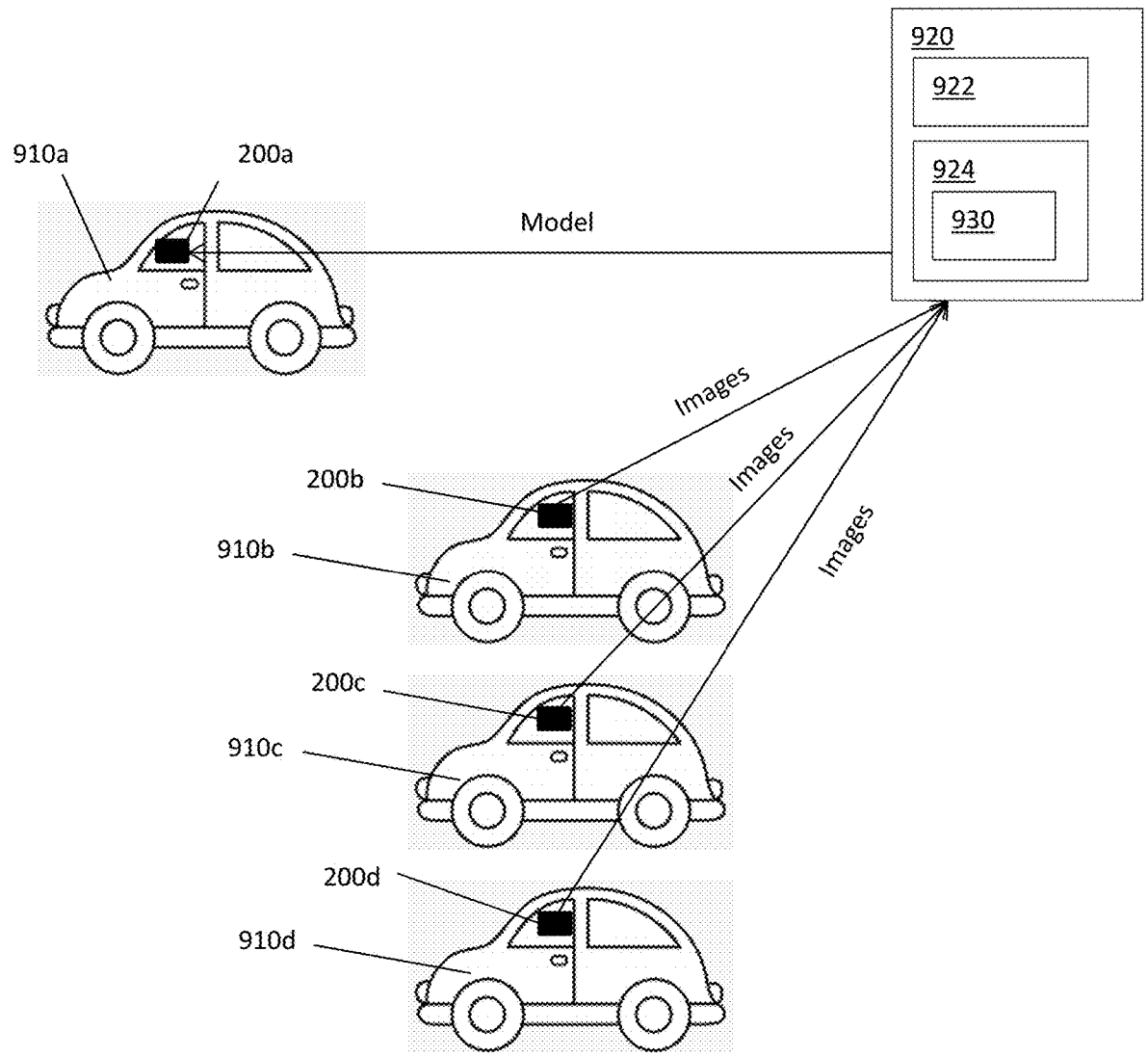
FIG. 9 illustrates a technique of determining a model for use by the apparatus of FIG. 2 in accordance with some embodiments.

FIG. 9 illustrates a technique of determining a model for use by the apparatus 200 in accordance with some embodiments. As shown in the figure, there may be multiple vehicles 910a-910d with respective apparatuses 200a-200d. Each of the apparatuses 200a-200d may have the configuration and features described with reference to the apparatus 200 of FIG. 2. During use, cameras of the apparatuses 200b-200d in the vehicles 910b-910d capture images of the environments outside the respective vehicles 910b-910d. The images are transmitted, directly or indirectly, to a server 920 via a network (e.g., a cloud, the Internet, etc.). The server 920 include a processing unit 922 configured to process the images from the apparatuses 200b-300d in the vehicles 910b-910d to determine a model 930. The model 930 may then be stored in a non-transitory medium 924 in the server 920. The server 920 may transmit the model 930, directly or indirectly, to the apparatus 200a in the vehicle 910a via a network (e.g., a cloud, the Internet, etc.). The apparatus 200a can then use the model 930 to process images received by the camera of the apparatus 200a to determine a region of interest for the camera.

In the example shown in FIG. 9, there are three apparatuses 200b-200d in three respective vehicles 910b-910d for providing images. In other examples, there may be more than three apparatuses 200 in more than three respective vehicles 910 for providing images to the server 920, or there may be fewer than three apparatuses 200 in fewer than three vehicles 910 for providing images to the server 920.

In some embodiments, the model 930 provided by the server 920 may be a neural network model. In such cases, the server 920 may be a neural network, or a part of a neural network, and the images from the apparatuses 200b-200d may be utilized by the server 920 to configure the model 930. In particular, the processing unit 922 of the server 920 may configure the model 930 by training the model 930 via machine learning. In some cases, the images from the different apparatuses 200b-200d form a rich data set from different cameras mounting at different positions with respect to the corresponding vehicles, which will be useful in training the model 930. As used in this specification, the term "neural network" refers to any computing device, system, or module made up of a number of interconnected processing elements, which process information by their dynamic state response to input. In some embodiments, the neural network may have deep learning capability and/or artificial intelligence. In some embodiments, the neural network may be simply any computing element that can be trained using one or more data sets. By means of non-limiting examples, the neural network may be a perceptron, a feedforward neural network, a radial basis neural network, a deep-feed forward neural network, a recurrent neural network, a long/short term memory neural network, a gated recurrent unit, an auto encoder neural network, a variational auto encoder neural network, a denoising auto encoder neural network, a sparse auto encoder neural network, a Markov chain neural network, a Hopfield neural network, a Boltzmann machine, a restricted Boltzmann machine, a deep belief network, a convolutional network, a deconvolutional network, a deep convolutional inverse graphics network, a generative adversarial network, a liquid state machine, an extreme learning machine, an echo state network, a deep residual network, a Kohonen network, a support vector machine, a neural turing machine, a modular neural network, a sequence-to-sequence model, etc., or any combination of the foregoing.

In some embodiments, the processing unit 922 of the server 920 uses the images to configure (e.g., to train) the model 930 to identify certain objects. By means of non-limiting examples, the model 930 may be configured to identify a leading vehicle, a vehicle that is not a leading vehicle (e.g., a vehicle that is not traveling in the same lane as the vehicle with the camera capturing images), etc. In some embodiments, the model 930 may be configured to identify certain components of a vehicle, such as a trunk, tail light(s), license plate, side door, side window, a roof of a vehicle, etc. The model 930 may also be configured to use one or more of the identified components to determine whether a vehicle is a leading vehicle or not.

In other embodiments, the model 930 may not be a neural network model, and may be any of other types of model. In such cases, the configuring of the model 930 by the processing unit 922 may not involve any machine learning, and/or images from the apparatuses 200b-200d may not be needed. Instead, the configuring of the model 930 by the processing unit 922 may be achieved by the processing unit 922 determining (e.g., obtaining, calculating, etc.) processing parameters (such as feature extraction parameters) for the model 930. In some embodiments, the model may include program instructions, commands, scripts, parameters (e.g., feature extraction parameters), etc. In one implementation, the model may be in a form of an application that can be received wirelessly by the apparatus 200.

After the model 930 has been configured by the server 920, the model 930 is then available for use by apparatuses 200 in different vehicles 910 to identify objects in camera images. As shown in the figure, the model 930 may be transmitted from the server 920 to the apparatus 200a in the vehicle 910a. The model 930 may also be transmitted from the server 920 to the apparatuses 200b-200d in the respective vehicles 910b-910d. After the apparatus 200a has received the model 930, the processing unit in the apparatus 200a may then process images generated by the camera of the apparatus 200a to identify objects, such as leading vehicles, and to determine region of interest for the camera 202 based on the identified objects, as described herein.

In some embodiments, the transmission of the model 930 from the server 920 to the apparatus 200 (e.g., the apparatus 200a) may be performed by the server 920 "pushing" the model 930, so that the apparatus 200 is not required to request for the model 930. In other embodiments, the transmission of the model 930 from the server 920 may be performed by the server 920 in response to a signal generated and sent by the apparatus 200. For example, the apparatus 200 may generate and transmit a signal after the apparatus 200 is turned on, or after the vehicle with the apparatus 200 has been started. The signal may be received by the server 920, which then transmits the model 930 for reception by the apparatus 200. As another example, the apparatus 200 may include a user interface, such as a button, which allows a user of the apparatus 200 to send a request for the model 930. In such cases, when the button is pressed, the apparatus 200 then transmits a request for the model 930 to the server 920. In response to the request, the server 920 then transmits the model to the apparatus 200.

It should be noted that the server 920 of FIG. 9 is not limiting to being one server device, and may be more than one server devices. Also, the processing unit 922 of the server 920 may include one or more processors, one or more processing modules, etc.

In other embodiments, the images obtained by the server 920 may not be generated by the apparatuses 200b-200d. Instead, the images used by the server 920 to determine (e.g., to train, to configure, etc.) the model 930 may be recorded using other device(s), such as mobile phone(s), camera(s) in other vehicles, etc. Also, in other embodiments, the images used by the server 920 to determine (e.g., to train, to configure, etc.) the model 930 may be downloaded to the server 920 from a database, such as from a database associated with the server 920, or a database owned by a third party.

Figure 10A:
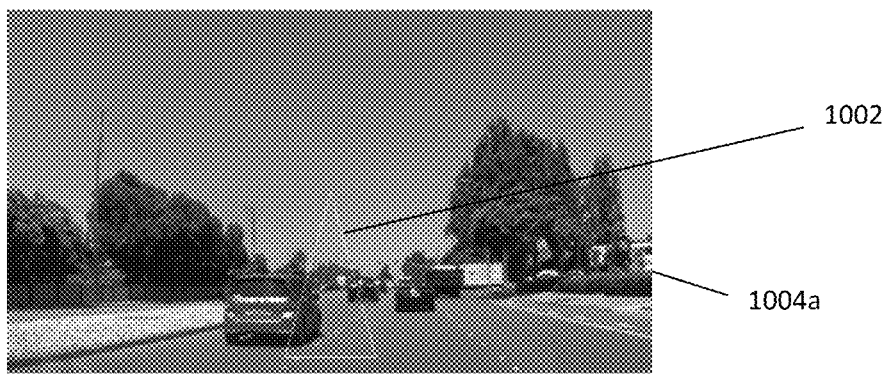
FIGS. 10A-10I illustrates a method for cropping camera images based on region(s) of interest.
Figure 10B:
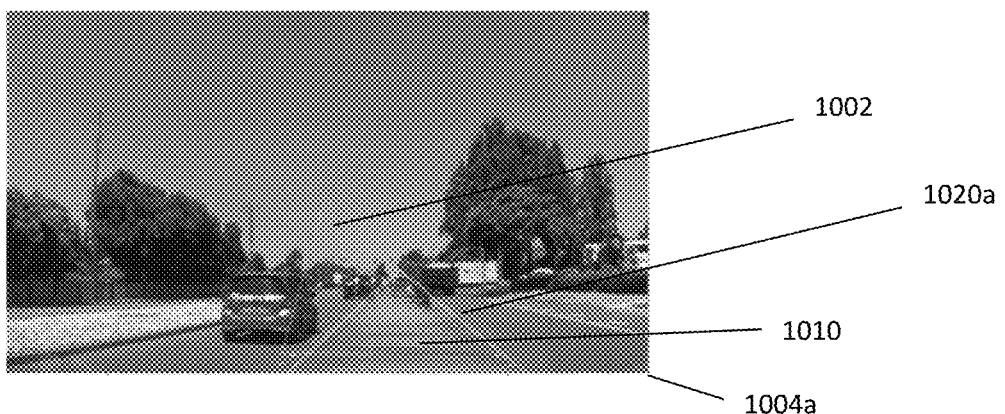
Figure 10C:
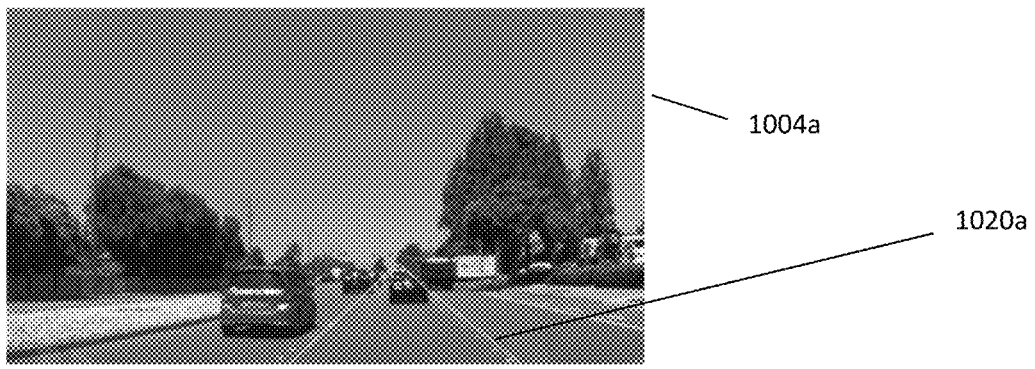

In some embodiments, the processing unit 210 may be configured to crop camera images based on the determined region of interest. FIGS. 10A-10I illustrates a method for cropping camera images based on region(s) of interest. The method may be performed by the processing unit 210 in some embodiments. First, as shown in FIG. 10A, the processing unit 210 may determine a default region of interest 1002. The default region of interest 1002 has a pre-defined geometry (in the example, it is a triangle with a certain shape and dimension), and may have a certain pre-defined position with respect to a camera image frame. The geometry and location information of the default region of interest 1002 may be stored in the non-transitory medium 230 of the apparatus 200 in some embodiments. As shown in the figure, based on the default region of interest 1002, the processing unit 210 may determine a first crop frame 1004a for cropping camera images. The first crop frame 1004a has a size that is smaller than or equal to a full camera frame. The first crop frame 1004a may be centered around the default region of interest 1002 in some embodiments.

Next, as shown in FIGS. 10B-11C, the processing unit 210 identifies objects (e.g., cars in the current lane in front of the subject vehicle) in multiple images cropped based on the first crop frame 1004a, and determines object identifiers 1010 (which are lines in the example) for the respective objects. The processing unit 210 then determines a first region of interest 1020a based on the object identifiers 1010. The processing unit 210 may perform the acts of identifying objects, determining object identifiers, and determining region of interest using any of the techniques described herein.

Figure 10D:
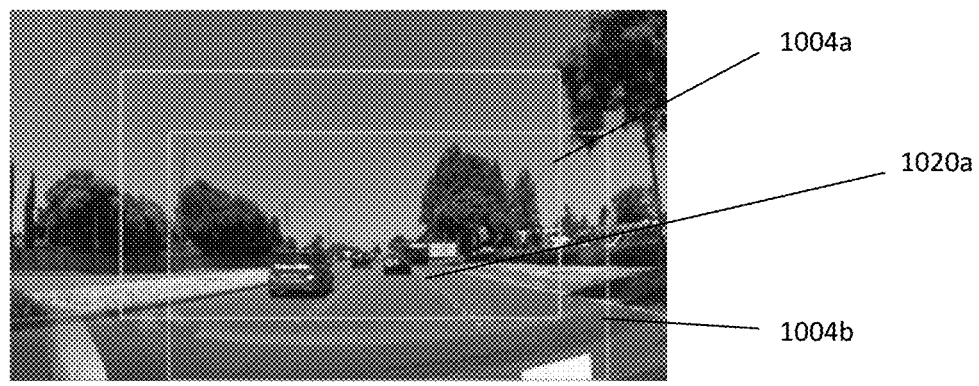

Next, the processing unit 210 determines a second crop frame 1004b based on the identified objects in the previous images (that were cropped based on the first crop frame 1004a). The second crop frame 1004b may be considered as an updated version of the first crop frame 1004a. In some embodiments, the processing unit 210 may determine the second crop frame 1004b based on the first region of interest 1020a. For example, the second crop frame 1004b may have a certain predetermined dimension, and may be centered around the first region of interest 1020a (e.g., around a center of the first region of interest 1020a). In other embodiments, the processing unit 210 may determine the second crop frame 1004b without utilizing the first region of interest 1020a. For example, in other embodiments, the processing unit 210 may determine a median of the object identifiers 1010, and may determine the second crop frame 1004b based on the median. In one implementation, the second crop frame 1004b is centered around the median of the object identifiers 1010. The median of the object identifiers 1010 represents a center of the distribution of the identified objects. As shown in FIG. 10D, the second crop frame 1004b has a size that is less than a full image frame, and is for use by the processing unit 210 to crop future images.

Figure 10E:
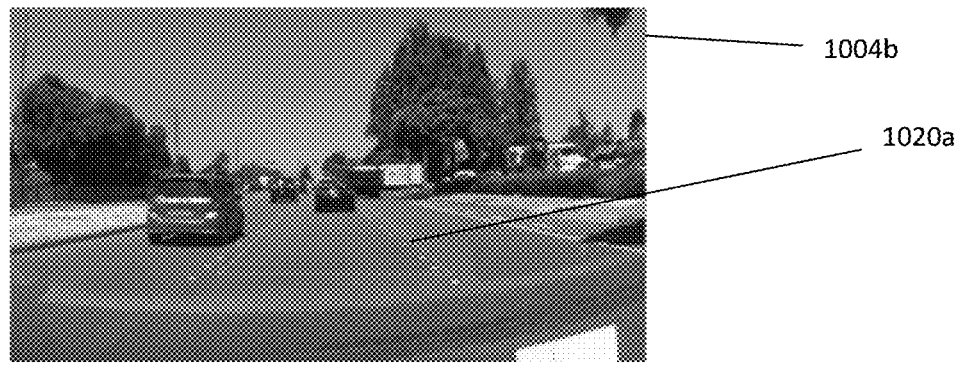
Figure 10F:
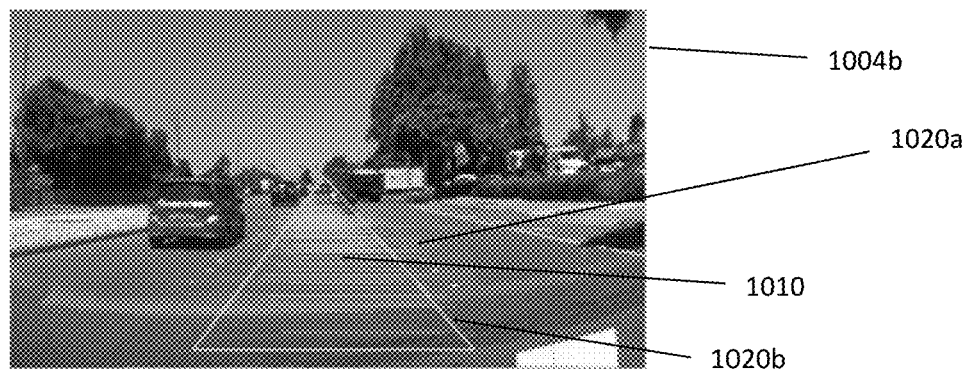
Figure 10G:
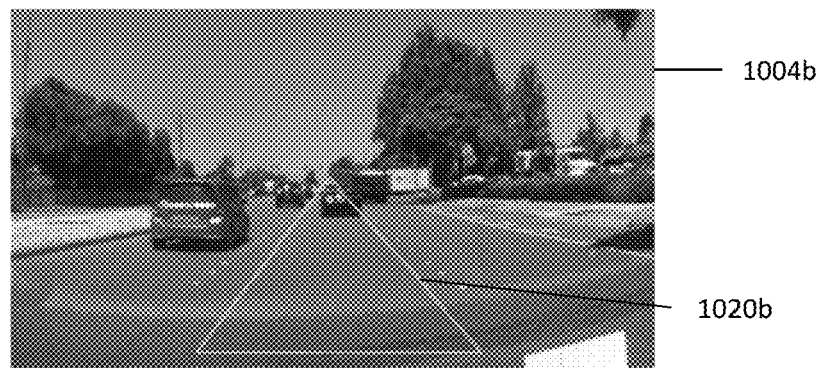

FIG. 10E illustrates a camera image that has been cropped based on the second crop frame 1004b. The first region of interest 1020a is also shown. As shown in the figure, the first region of interest 1020a that was previously located off-center with respect to the first crop frame 1004a is now centered with respect to the second crop frame 1004b. The processing unit 210 crops images using the second crop frame 1004b, and identifies objects (e.g., cars in the current lane in front of the subject vehicle) in the cropped images. The processing unit 210 also determines object identifiers 1010 for the respective identified objects, and may also determine a second region of interest 1020b based on the distribution of the object identifiers 1010 (FIGS. 10F-10G).

Figure 10H:
Figure 10I:
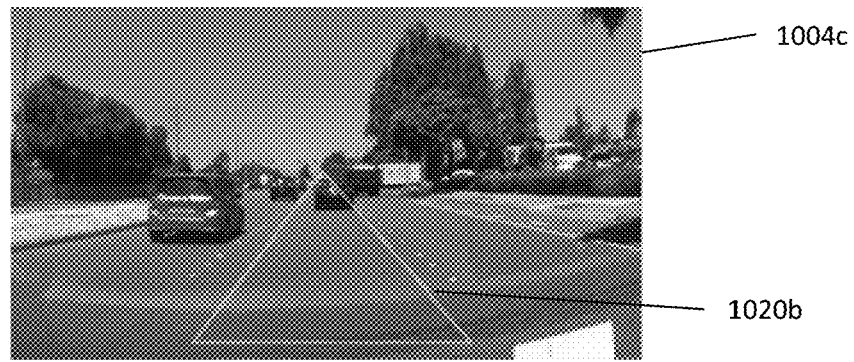

Next, as shown in FIG. 10H, the processing unit 210 determines a third crop frame 1004c based on the identified objects in the previous images (that were cropped based on the second crop frame 1004b). The third crop frame 1004c may be considered as an updated version of the previous crop frame 1004b. In some embodiments, the processing unit 210 may determine the third crop frame 1004c based on the second region of interest 1020b. For example, the third crop frame 1004c may have a certain predetermined dimension, and may be centered around the second region of interest 1020b (e.g., around a center of the second region of interest 1020b). In other embodiments, the processing unit 210 may determine the third crop frame 1004c without utilizing the second region of interest 1020b. For example, in other embodiments, the processing unit 210 may determine a median of the object identifiers 1010, and may determine the third crop frame 1004c based on the median. In one implementation, the third crop frame 1004c is centered around the median of the object identifiers 1010. The median of the object identifiers 1010 represents a center of the distribution of the identified objects. As shown in FIG. 10H, the third crop frame 1004c has a size that is less than a full image frame, and is for use by the processing unit 210 to crop future images. An image cropped based on the third crop frame 1004c is shown in FIG. 10I. The second region of interest 1020b is also shown.

In some embodiments, the acts of identifying objects in cropped images (cropped based on a crop frame), and determining a new crop frame based on the identified objects, may be repeatedly performed by the processing unit 210. This allows the crop frame to be updated periodically. In some embodiments, the crop frame may be updated based on a satisfactory of a certain criterion. For example, the crop frame may be updated when a certain period has passed— e.g., updated repeatedly every certain period, such as every 3 seconds, every 5 seconds, every minute, every 5 minutes, every 10 minutes, every 20 minutes, every 30 minutes, every hour, every 1.5 hours, every 2 hours, etc. In other embodiments, the crop frame may be updated if a median of identified objects in a moving window of time (e.g., last 3 seconds, last 5 seconds, last minute, last 5 minutes, last 10 minutes, last 20 minutes, last 30 minutes, last hour, last 1.5 hours, last 2 hours, etc.) differs from the previously determined median. The median of identified objects may be median of one or more coordinate components of identified objects. For example, the median of identified objects may be a median of x-coordinates of the identified objects and/or a median of y-coordinates of the identified objects.

In further embodiments, the crop frame may be updated repeatedly by the processing unit 210 until a solution converges. For example, as the crop frame is repeatedly updated, the difference between the position of the updated crop frame and the position of the previously updated crop frame may decrease in each cycle of update. In some embodiments, the processing unit 210 may determine that a converged solution has been reached if the difference between the position of the currently updated crop frame and the position of the previously updated crop frame is less than a certain threshold. The threshold may be a positional threshold expressed in dimension (e.g., 2 mm) or number of pixels (e.g., 5 pixels).

In some embodiments, the above technique of updating crop frame may not involve determination of region of interest 1020. For example, in some embodiments, a center of the distribution of the identified objects may be used to determine the position of the crop frame with respect to the full camera image frame. The center of the distribution of the identified objects may be represented by median of the identified objects in some embodiments.

In the above embodiments, the processing unit 210 has been described as being configured to identify leading vehicles, and determine a region of interest based on the identified leading vehicles. In other embodiments, the processing unit 210 may be configured to identify other objects in the lane in which the vehicle is traveling, and to determine a region of interest based on the detected objects. For example, in other embodiments, the processing unit 210 may be configured to determine a center marking of a lane, a left boundary of the lane in which the vehicle is traveling, a right boundary of the lane in which the vehicle is traveling, or any combination of two or more of the foregoing. The processing unit 210 then determines a distribution of the detected objects, and determines the region of interest based on the distribution of the detected objects.

The apparatuses and methods described herein for determining region of interest to calibrate vehicle cameras are advantageous because they do not necessarily require a user of the apparatus to provide any manual input during a calibration process. Instead, the camera calibration can occur automatically, and can be repeated periodically "behind-the-scene". This is especially useful for aftermarket devices with cameras, because these devices may be removed and remounted to the vehicles at different positions with respect to the vehicles. The self-calibration of the camera allows the apparatus 200 to know where is the region of interest regardless of how the apparatus 200 is mounted to the vehicle. Accordingly, even if the apparatus 200 is mounted at very off angle, the techniques described herein can still allow the apparatus 200 to determine the region of interest corresponding with the space in front of the vehicle, and to use the region of interest for monitoring objects in a potential collision trajectory. Although the above features are useful for aftermarket devices, they may also be advantageous for calibrating factory-installed cameras in vehicles. Sometimes cameras may be installed out of alignment during manufacturing of the vehicle. Even if the cameras are installed correctly, they may vary slightly in position and/or orientation. Embodiments of the techniques described herein are also useful for calibrating these factory-installed cameras.

Also, as illustrated in the above embodiments, the technique of determining a distribution of identified objects (e.g., leading vehicles) in front of the subject vehicle over time, and combining identifiers of the identified objects to form the region of interest 700, is advantageous. By combining (e.g., stacking, aggregating, overlaying, etc.) the identifiers of the objects identified in the different camera images over time, the combined identifiers form the region of interest 700 that corresponds geometrically (e.g., in shape, size, position, etc.) with the lane in which the vehicle is traveling. The combined identifiers automatically form a two-dimensional area corresponding with the spatial coverage of the region of interest. This is more advantageous than the technique of determining and monitoring lane boundaries, which does not define any spatial coverage for detecting and monitoring objects in possible collision course with the subject vehicle.

In addition, once the region of interest 700 is determined, it can then be used repeatedly to process subsequent images from the camera 202. Accordingly, the geometry (e.g., shape, size, position relative to a camera frame, etc.) of the region of interest 700 remains the same during the processing of the subsequent images from the camera. This technique is more efficient and accurate than the technique of detecting lane boundaries in real time. Lane detection technique may result in detection of the wrong lane if the camera is mounted at very off angle.

Although the above embodiments have been described with reference to calibrating the first camera 202 that captures images outside the vehicle, in other embodiments, similar techniques may also be employed to calibrate the second camera 204 or any camera that is configured to capture images of the cabin inside the vehicle. For example, in some embodiments, the processing unit 210 may be configured to process images from the second camera 204 to identify a head of the driver in the different images. The processing unit 210 then determines a region of interest based on a distribution of the detected head in the different images. The region of interest may then be used by the processing unit 210 to search for head images in future camera images output by the second camera 204.

Specialized Processing System

Figure 11:
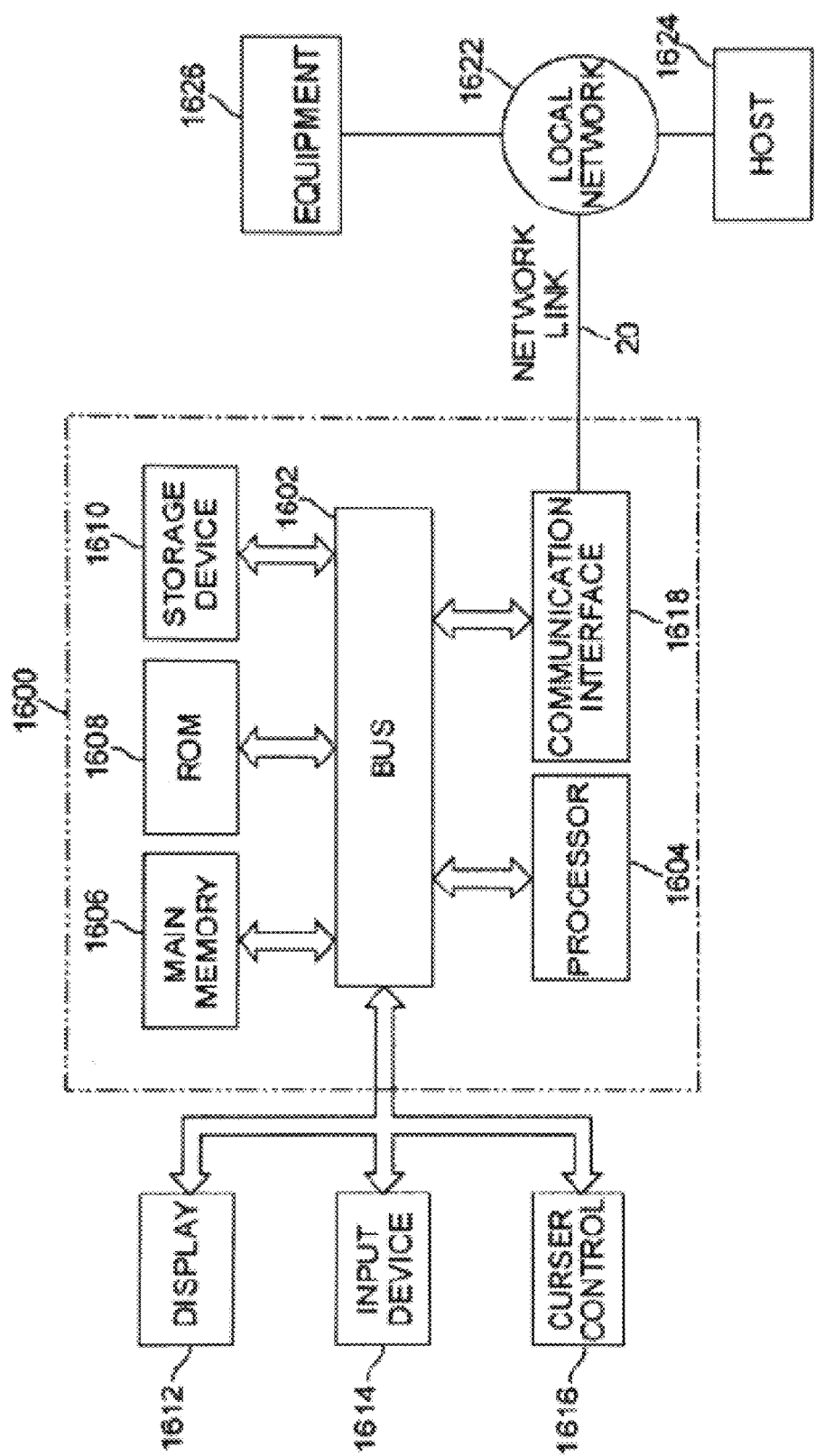
FIG. 11 illustrates a specialized processing system for implementing one or more electronic devices described herein.

FIG. 11 illustrates a specialized processing system for implementing one or more electronic devices described herein. For examples, the processing system 1600 may implement the apparatus 200, or at least a part of the apparatus 200, such as the processing unit 210 of the apparatus 200.

Processing system 1600 includes a bus 1602 or other communication mechanism for communicating information, and a processor 1604 coupled with the bus 1602 for processing information. The processor system 1600 also includes a main memory 1606, such as a random access memory (RAM) or other dynamic storage device, coupled to the bus 1602 for storing information and instructions to be executed by the processor 1604. The main memory 1606 also may be used for storing temporary variables or other intermediate information during execution of instructions to be executed by the processor 1604. The processor system 1600 further includes a read only memory (ROM) 1608 or other static storage device coupled to the bus 1602 for storing static information and instructions for the processor 1604. A data storage device 1610, such as a magnetic disk or optical disk, is provided and coupled to the bus 1602 for storing information and instructions.

The processor system 1600 may be coupled via the bus 1602 to a display 167, such as a screen or a flat panel, for displaying information to a user. An input device 1614, including alphanumeric and other keys, or a touchscreen, is coupled to the bus 1602 for communicating information and command selections to processor 1604. Another type of user input device is cursor control 1616, such as a touchpad, a touchscreen, a trackball, or cursor direction keys for communicating direction information and command selections to processor 1604 and for controlling cursor movement on display 167. This input device typically has two degrees of freedom in two axes, a first axis (e.g., x) and a second axis (e.g., y), that allows the device to specify positions in a plane.

In some embodiments, the processor system 1600 can be used to perform various functions described herein. According to some embodiments, such use is provided by processor system 1600 in response to processor 1604 executing one or more sequences of one or more instructions contained in the main memory 1606. Those skilled in the art will know how to prepare such instructions based on the functions and methods described herein. Such instructions may be read into the main memory 1606 from another processor-readable medium, such as storage device 1610. Execution of the sequences of instructions contained in the main memory 1606 causes the processor 1604 to perform the process steps described herein. One or more processors in a multi-processing arrangement may also be employed to execute the sequences of instructions contained in the main memory 1606. In alternative embodiments, hard-wired circuitry may be used in place of or in combination with software instructions to implement the various embodiments described herein. Thus, embodiments are not limited to any specific combination of hardware circuitry and software.

The term "processor-readable medium" as used herein refers to any medium that participates in providing instructions to the processor 1604 for execution. Such a medium may take many forms, including but not limited to, non-volatile media, volatile media, and transmission media. Non-volatile media includes, for example, optical or magnetic disks, such as the storage device 1610. A non-volatile medium may be considered an example of non-transitory medium. Volatile media includes dynamic memory, such as the main memory 1606. A volatile medium may be considered an example of non-transitory medium. Transmission media includes cables, wire and fiber optics, including the wires that comprise the bus 1602. Transmission media can also take the form of acoustic or light waves, such as those generated during radio wave and infrared data communications.

Common forms of processor-readable media include, for example, hard disk, a magnetic medium, a CD-ROM, any other optical medium, a RAM, a PROM, and EPROM, a FLASH-EPROM, any other memory chip or cartridge, a carrier wave as described hereinafter, or any other medium from which a processor can read.

Various forms of processor-readable media may be involved in carrying one or more sequences of one or more instructions to the processor 1604 for execution. For example, the instructions may initially be carried on a storage of a remote computer or remote device. The remote computer or device can send the instructions over a network, such as the Internet. A receiving unit local to the processing system 1600 can receive the data from the network, and provide the data on the bus 1602. The bus 1602 carries the data to the main memory 1606, from which the processor 1604 retrieves and executes the instructions. The instructions received by the main memory 1606 may optionally be stored on the storage device 1610 either before or after execution by the processor 1604.

The processing system 1600 also includes a communication interface 1618 coupled to the bus 1602. The communication interface 1618 provides a two-way data communication coupling to a network link 1620 that is connected to a local network 1622. For example, the communication interface 1618 may be an integrated services digital network (ISDN) card to provide a data communication. As another example, the communication interface 1618 may be a local area network (LAN) card to provide a data communication connection to a compatible LAN. Wireless links may also be implemented. In any such implementation, the communication interface 1618 sends and receives electrical, electromagnetic or optical signals that carry data streams representing various types of information.

The network link 1620 typically provides data communication through one or more networks to other devices. For example, the network link 1620 may provide a connection through local network 1622 to a host computer 1624 or to equipment 1626. The data streams transported over the network link 1620 can comprise electrical, electromagnetic or optical signals. The signals through the various networks and the signals on the network link 1620 and through the communication interface 1618, which carry data to and from the processing system 1600, are exemplary forms of carrier waves transporting the information. The processing system 1600 can send messages and receive data, including program code, through the network(s), the network link 1620, and the communication interface 1618.

As used in this specification, the term "image" is not limited to an image that is displayed, and may refer to an image that is displayed or not displayed (e.g., an image in data or digital form that is stored). Similarly, as used in this specification, the term "graphical element" or any of other similar terms, such as "graphical identifier", may refer to an item that is displayed or not displayed. The item may be a computational element, an equation representing the graphical element/identifier, one or more geometric parameters associated with the graphical element/identifier.

In addition, as used in this specification, the term "model" may refer to one or more algorithms, one or more equations, one or more processing applications, one or more variables, one or more criteria, one or more parameters, or any combination of two or more of the foregoing.

Also, as used in this specification, the term "signal" may refer to one or more signals. By means of non-limiting examples, a signal may include one or more data, one or more information, one or more signal values, one or more discrete values, etc.

Although particular features have been shown and described, it will be understood that they are not intended to limit the claimed invention, and it will be made obvious to those skilled in the art that various changes and modifications may be made without departing from the spirit and scope of the claimed invention. The specification and drawings are, accordingly to be regarded in an illustrative rather than restrictive sense. The claimed invention is intended to cover all alternatives, modifications and equivalents.

What is claimed:

1. An apparatus comprising:
a first camera configured to view an environment outside a vehicle; and
a processing unit configured to receive images generated at different respective times by the first camera;
wherein the processing unit is configured to identify objects in front of the vehicle based on the respective images generated at the different respective times, determine a distribution of the identified objects, and determine a region of interest based on the distribution of the identified objects in the respective images generated at the different respective times; and
wherein the objects comprise a first object detected in a first image of the images, and a second object detected in a second image of the images, and wherein the distribution of the identified objects comprises an aggregation of a first area associated with a first position of the first object detected in the first image and a second area associated with a second position of the second object detected in the second image.

2. The apparatus of claim 1, further comprising a non-transitory medium storing a model, wherein the processing unit is configured to identify the objects in front of the vehicle using the model.

3. The apparatus of claim 2, wherein the model comprises a neural network model.

4. The apparatus of claim 3, further comprising a communication unit configured to obtain the neural network model.

5. The apparatus of claim 2, wherein the objects comprise leading vehicles in front of the vehicle, and wherein the processing unit is configured to identify the leading vehicles using the model.

6. The apparatus of claim 1, wherein the processing unit is also configured to determine identifiers corresponding with the identified objects respectively.

7. The apparatus of claim 6, wherein the identifiers comprise respective boxes corresponding with the respective identified objects.

8. The apparatus of claim 6, wherein the identifiers comprise respective horizontal lines corresponding with respective identified objects, wherein one of the horizontal lines has the first area, and another one of the horizontal lines has the second area.

9. The apparatus of claim 6, wherein the processing unit is configured to combine the identifiers to form a set of identifiers representing the distribution of the identified objects.

10. The apparatus of claim 9, wherein the region of interest is based on, or corresponds with, the set of identifiers.

11. The apparatus of claim 9, wherein the set of identifiers comprises graphical elements combined into a composite object.

12. The apparatus of claim 11, wherein the composite object has a tapered configuration.

13. The apparatus of claim 11, wherein the composite object has a first object area that is closer to a bottom of a camera frame than to a top of the camera frame, and a second object area that is above the first object area, and wherein the first object area has a width that is longer than a width of the second object area.

14. The apparatus of claim 1, wherein the processing unit is also configured to determine a collision risk based on the region of interest.

15. The apparatus of claim 1, wherein the processing unit is also configured to determine an obstacle in a trajectory of the vehicle based on the region of interest.

16. The apparatus of claim 1, wherein the processing unit is configured to:
determine the region of interest automatically in response to an activation of the apparatus, and/or
update the region of interest periodically.

17. The apparatus of claim 1, wherein the first camera and the processing unit are integrated as parts of an aftermarket device for the vehicle.

18. The apparatus of claim 17, further comprising a second camera configured to view inside a cabin of the vehicle, wherein the second camera is a part of the aftermarket device.

19. The apparatus of claim 1, wherein the processing unit is configured to determine an image crop frame based on the identified objects.

20. The apparatus of claim 19, wherein the processing unit is configured to update the image crop frame repeatedly.

21. The apparatus of claim 20, wherein the processing unit is configured to update the image crop frame repeatedly until a solution converges.

22. An apparatus comprising:
a first camera configured to view an environment outside a vehicle; and
a processing unit configured to receive images generated at different respective times by the first camera;
wherein the processing unit is configured to identify objects in front of the vehicle based on the respective images generated at the different respective times, determine a distribution of the identified objects, and determine a region of interest based on the distribution of the identified objects in the respective images generated at the different respective times;
wherein the apparatus further comprises a non-transitory medium storing a model, wherein the processing unit is configured to identify the objects in front of the vehicle using the model, the model comprising a neural network model; and
wherein the neural network model is trained based on images generated by on-board devices in other vehicles.

23. An apparatus comprising:
a first camera configured to view an environment outside a vehicle; and
a processing unit configured to receive images generated at different respective times by the first camera;
wherein the processing unit is configured to identify objects in front of the vehicle based on the respective images generated at the different respective times, determine a distribution of the identified objects, and determine a region of interest based on the distribution of the identified objects in the respective images generated at the different respective times;
wherein the processing unit is configured to determine an image crop frame based on the identified objects; and
wherein the processing unit is configured to determine a median position of the identified objects, and determine the image crop frame based on the median position.

24. An apparatus comprising:
a first camera configured to view an environment outside a vehicle; and
a processing unit configured to receive images generated at different respective times by the first camera;
wherein the processing unit is configured to identify leading vehicles in front of the vehicle in the respective images generated at the different respective times, wherein the processing unit is configured to identify the leading vehicles using a neural network model that is trained based on images generated by on-board devices in other vehicles;
wherein the processing unit is configured to determine identifiers corresponding respectively with the identified leading vehicles in the respective images;
wherein the processing unit is configured to combine the identifiers associated with the respective images to form a set of identifiers; and
wherein the processing unit is configured to determine a region of interest based on the set of identifiers associated with the respective images, the region of interest being a single area defined with respect to an image frame.

25. A method performed by an apparatus, comprising:
receiving images generated at different respective times by a first camera viewing an environment outside a vehicle;
identifying objects in front of the vehicle based on the respective images generated at the different respective times;
determining a distribution of the identified objects; and
determining a region of interest based on the distribution of the identified objects in the respective images generated at the different respective times;
wherein the objects comprise a first object detected in a first image of the images, and a second object detected in a second image of the images, and wherein the distribution of the identified objects comprises an aggregation of a first area associated with a first position of the first object detected in the first image and a second area associated with a second position of the second object detected in the second image.

* * * * *